United States Patent [19]

Hunerberg

[11] Patent Number: 4,473,516
[45] Date of Patent: Sep. 25, 1984

[54] METHOD AND APPARATUS FOR INJECTION MOLDING PLASTIC ARTICLES HAVING SOLID EXTERIOR SURFACES AND POROUS INTERIOR CORES

[75] Inventor: Edward C. Hunerberg, Tecumseh, Mich.

[73] Assignee: Hoover Universal, Inc., Ann Arbor, Mich.

[21] Appl. No.: 454,942

[22] Filed: Jan. 3, 1983

[51] Int. Cl.³ .............................................. B29D 27/00
[52] U.S. Cl. ................................... 264/45.1; 264/45.5; 264/54; 264/DIG. 5; 264/DIG. 83; 425/559; 425/562; 425/817 R; 521/85
[58] Field of Search .................... 264/50, 51, DIG. 83, 264/54, DIG. 5, 45.5, 45.1; 425/559, 562, 817 R; 521/85

[56] References Cited

U.S. PATENT DOCUMENTS

| 2,758,980 | 8/1956 | Talalay et al. | 521/145 X |
| 3,268,636 | 8/1966 | Angell, Jr. | 264/51 |
| 3,436,446 | 4/1969 | Angell, Jr. | 264/51 |
| 3,773,877 | 11/1973 | Baker et al. | 264/DIG. 5 |
| 3,972,970 | 8/1976 | Taylor | 264/DIG. 5 |
| 3,988,403 | 10/1976 | Angell, Jr. et al. | 264/45.5 |
| 4,033,710 | 7/1977 | Hanning | 264/DIG. 83 |
| 4,059,661 | 11/1977 | Eck et al. | 264/DIG. 5 |
| 4,115,491 | 9/1978 | Hanning | 264/DIG. 83 |
| 4,129,635 | 12/1978 | Yasuike et al. | 264/45.5 |
| 4,134,687 | 1/1979 | Eckardt | 264/DIG. 83 |
| 4,135,870 | 1/1979 | Wallace et al. | 264/50 X |
| 4,140,672 | 2/1979 | Kataoka | 264/51 X |
| 4,247,515 | 1/1981 | Olabisi | 264/45.1 X |
| 4,255,367 | 3/1981 | Wallace et al. | 264/45.1 |
| 4,255,368 | 3/1981 | Olabisi | 264/45.5 |
| 4,383,048 | 5/1983 | Hall et al. | 264/DIG. 5 |

FOREIGN PATENT DOCUMENTS 574320  4/1976  Switzerland ............... 264/DIG. 83

Primary Examiner—Philip E. Anderson
Attorney, Agent, or Firm—Stephenson and Boller

[57] ABSTRACT

Method and apparatus for injection molding plastic articles having solid exterior surfaces and porous interior cores wherein a molten mixture of a chemically reactive foaming agent and a thermoplastic resin is injected into a mold so as to fill the mold cavity with unfoamed resin and form an outer solid skin on the molded article. Immediately prior to injection, an activator additive is introduced into the mixture, the additive reacting chemically with the foaming agent after a time delay of no more than a few seconds to provide for cellular expansion within the core of the molded article. The result is a molded body with a solid unfoamed skin which accurately relicates the surface of the mold and a cellular inner core.

7 Claims, 5 Drawing Figures

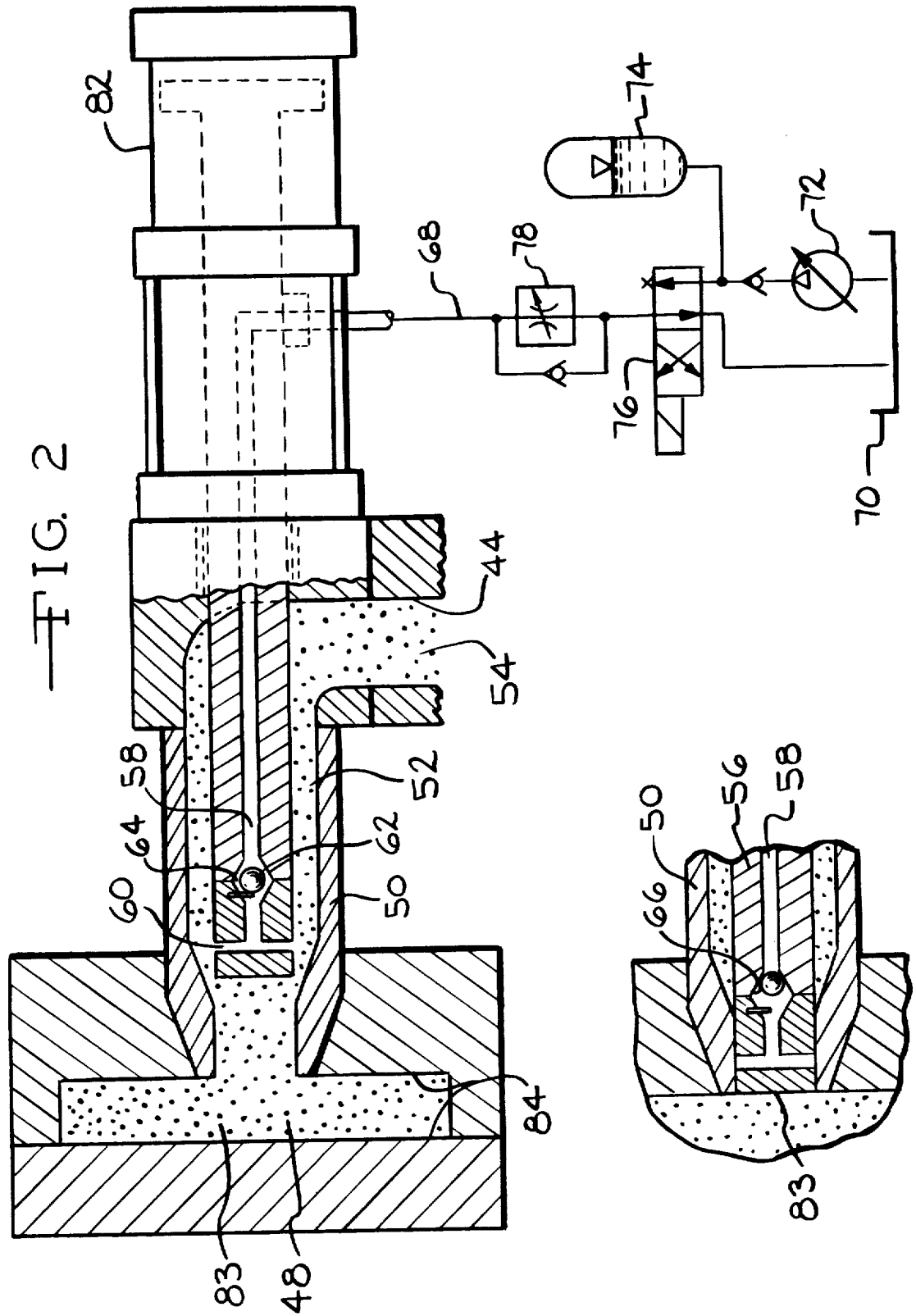

METHOD AND APPARATUS FOR INJECTION MOLDING PLASTIC ARTICLES HAVING SOLID EXTERIOR SURFACES AND POROUS INTERIOR CORES

BACKGROUND OF THE INVENTION

The present invention relates to method and apparatus for molding articles of structural foam. In structural foam molding, a molded article with a solid unfoamed skin and a cellular inner core has long been known to be desirable. Conventional structural foam molded parts are sometimes objected to on the grounds that they have surface imperfections, such as swirls, blisters, pin holes, pot marks, streaks and the like. These surface irregularities are produced by the expanding foam gas bubbles, as they move across the cold mold surface during filling of the mold, being permanently solidified by the colder mold surface.

In conventional structural foam molding processes in commercial use, the gas bubbles start to form when the resin enters the mold cavity, the bubble growth rate being a function of the pressure drop between the pre-pressurized resin and the mold cavity pressure which is usually at atmospheric pressure. U.S. Pat. Nos. 3,268,636 and 3,436,446 illustrate conventional processes.

The blowing agents used in the conventional structural foam molding processes can be classified as either physically or chemically generated, by which is meant the blowing agent is either a gas that is mixed with the resin in the plasticator or the blowing agent is a solid material which decomposes in the plasticator in response to heating of the solid blowing agent. Both physical and chemical blowing agents are introduced and mixed in the extruder and generally dissolve into the molten resin at the pressures and temperatures found in the resin molding system. Various prior art patents disclose processes utilizing these blowing agents which are intended to overcome the problem of surface imperfections on the molded parts.

For example, U.S. Pat. No. 3,988,403 discloses a system in which the mold surfaces are heated prior to introduction of the molding resin into the mold cavity in order to soften and "smooth out" surface imperfections. Such a system is objectionable because thermal cycling of the mold from hot to cold has many economic disadvantages such as increased energy consumption, increased cycle time and increased mold costs.

U.S. Pat. No. 4,255,367 attempts to solve the surface imperfection problem by selectively adding foaming agents to the melt stream during injection. In this way, a solid unfoamed material can be first injected into the mold to form the skin and then a foaming agent is introduced in the melt stream and injected into the core to form the cellular core structure. Proper sequencing of the injection mold fill cycle becomes critical and residual foam material must be purged from the system before the solid injection phase of the next cycle can begin. Since the foaming agent injection point is upstream of the manifold system and the injection nozzles considerable volume can exist to store unwanted material between shots. This residual foam material may be inadvertently injected into the mold causing imperfections in the surface of the part. Also, in some cases, the foam core material breaks through the mold surface. The mixing of core and skin materials adversely affects the surface of the molded article.

U.S. Pat. No. 4,255,368 discloses a method for producing a molded part with a foamed core and a non-foamed exterior shell by using a physical foaming agent such as nitrogen. The foaming agent is introduced into the polymer melt directly in the extruder prior to mold filling. A pressurized mold is used to retard the growth of foam bubbles during injection, the foam bubbles forming only after the mold has been completely filled. This process is objectionable because of the necessity to pressurize the mold with the attendant requirement for sealing valves and gaskets.

U.S. Pat. No. 4,247,515 discloses a system capable of forming articles with solid skins but not foamed cores. The process disclosed in this patent produces parts with solid color and smooth surfaces but there is no provision for a foamed core.

U.S. Pat. No. 4,129,635 shows a process for producing an article with a solid skin and a foamed interior. A foaming agent is introduced into the resin in the extruder and the mixture is injected into a pressurized mold to retard bubble expansion. This structure is objectionable because of the requirement for special molds designed for pre-pressurization and also capable of withstanding very high mold cavity pressures.

The object of this invention, therefore, is to provide an improved method and apparatus for forming plastic parts with exterior solid surfaces and foamed cores which overcomes the above objections.

SUMMARY OF THE INVENTION

In the method and apparatus of this invention, a resin, preferably in pellet or powder form, is melted and plasticized in a conventional extruder which also contains a chemically reactive foaming agent that is mixed with the resin. The resin containing the foaming agent is then transferred to an accumulation zone where they are maintained in a molten state. When a sufficient volume of the molten mixture is in the accumulation zone, the molten mixture is ejected from the accumulation zone to form a stream which is directed into the mold so as to fill the mold cavity with unfoamed molten resin which solidifies upon engagement with the mold surface to form a solid skin at the mold-resin interface.

An activator additive is introduced into the stream for flow into the mold and subsequent chemical reaction with the foaming agent resulting in a time-delayed generation of gas bubbles in the mixture within the confines of the solid skin. The result is in the formation of a molded article having a solid exterior surface which is a detailed replicate of the mold surface and a porous interior which expands in the mold to maintain the solid exterior surface in pressured contact with the mold surface so that it will conform in detail to the contour of the mold.

The particular object of applicant's invention is, therefore, achieved by virtue of the interaction of the foaming agent and the activator additive in the mold cavity. The result is a molded article having a porous interior core and a solid exterior skin which does not contain the objectionable surface imperfections heretofore described.

Further objects, features, and advantages of the invention will become apparent from a consideration of the following description and the appended claims when taken in conjunction with the accompanying drawing in which:

FIG. 2 is an enlarged elevational schematic view of an injection nozzle portion of the apparatus illustrated in FIG. 1, with some parts broken away and other parts shown in section for the purpose of clarity and showing a check valve in the nozzle in an open position;

Figure 4:
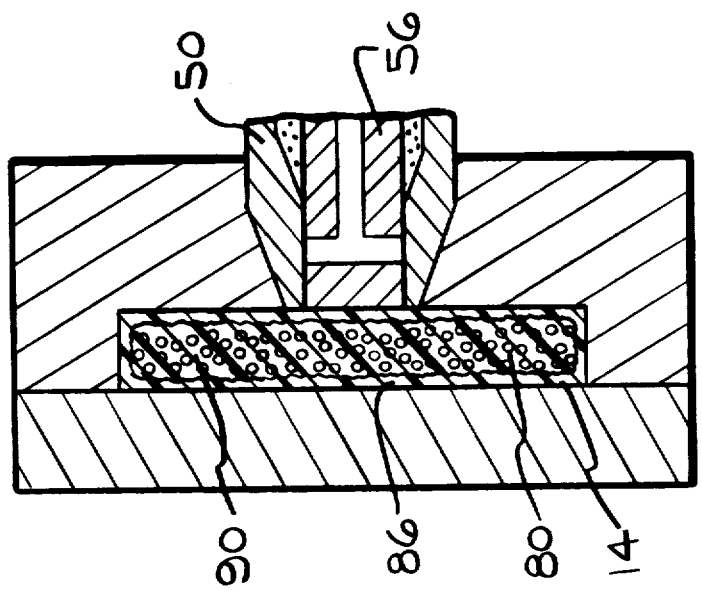
Figure 5:
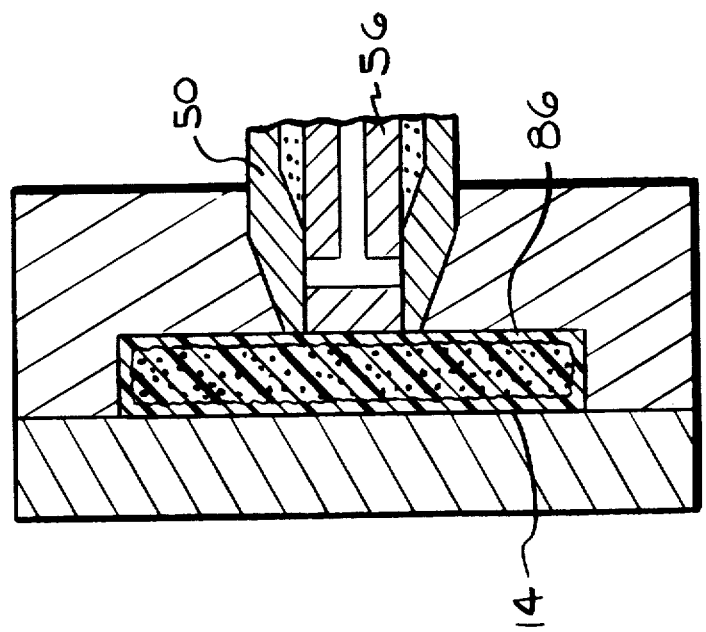

FIG. 3 is a view like FIG. 2 showing the injection nozzle and the check valve in closed positions; and FIGS. 4 and 5 are schematic sectional views illustrating the formation of the molded article in the mold, FIG. 4 showing the structure of the material in the mold at a time immediately following filling of the mold and FIG. 5 showing the expansion of the article core in the mold which occurs a predetermined time period after filling of the mold.

Figure 1:
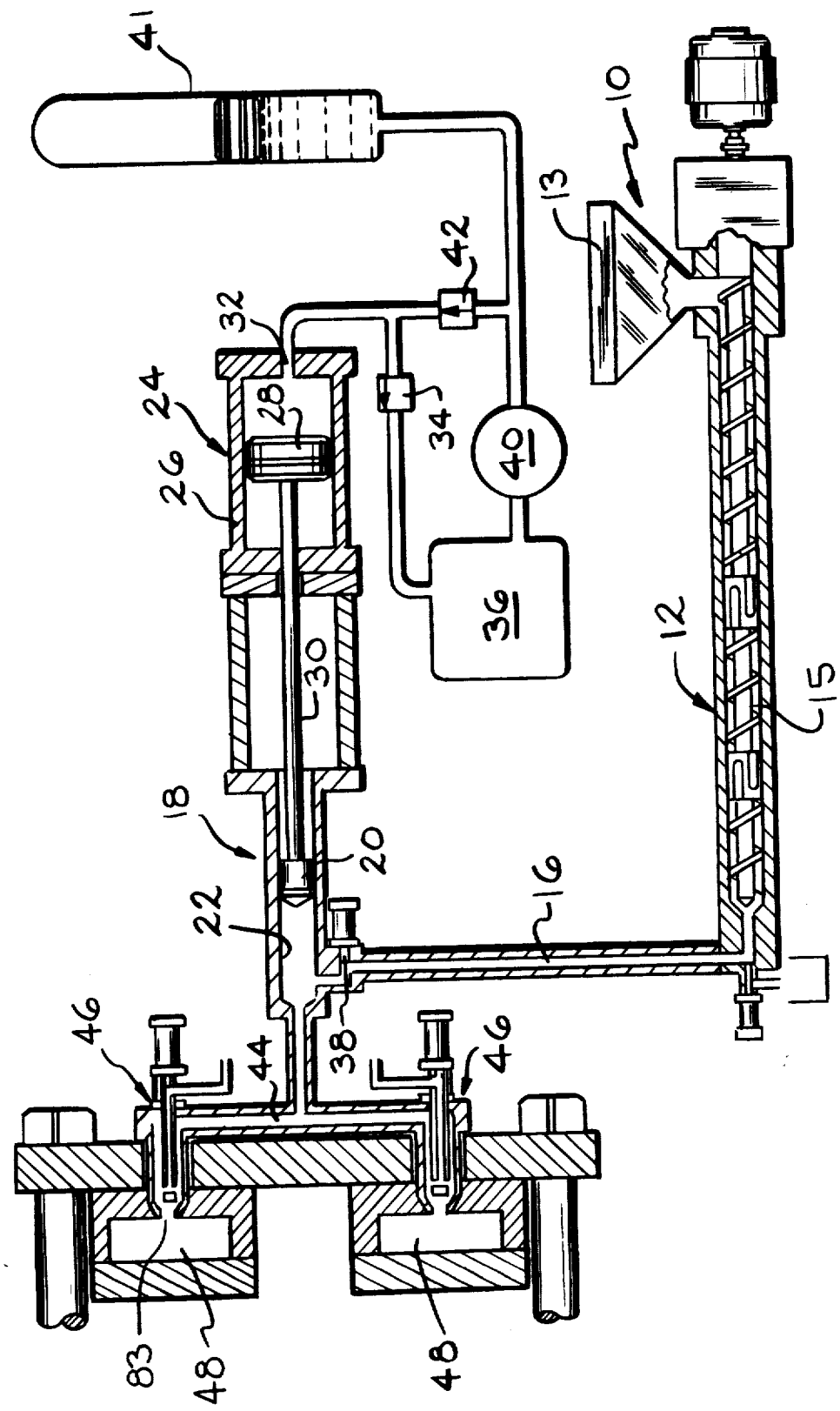
FIG. 1 is an elevational schematic view, partially in section, of apparatus capable of practicing the process of the present invention.

With reference to the drawing, the apparatus of this invention, indicated generally at 10, is illustrated in FIG. 1 as including a conventional melting extruder 12 having the usual hopper 13 and feed screw 15. The resin from which the molded article 14 (FIG. 5) is formed is melted and plasticated in the extruder 12. The extruder 12 also contains a chemically reactive foaming agent, which unlike conventional foaming agents, is not decomposed by heat. Gas evolution of a chemically reactive foaming agent is independent of processing tempertures so that such an agent will not generate gas prior to being combined with an activator agent. The extruder 12 provides for melting, plastication and mixing of the resin and the chemically reactive foaming agent and forces the mixture through a passage 16 into a melt accumulator 18. The accumulator 18 includes a piston 20 slidable in a cylinder passage 22 for molten material received from the extruder 12. The accumulator 18 also includes a hydraulic piston and cylinder assembly 24 comprised of a cylinder 26 and a piston 28 slidably supported therein and connected to the piston 20 by a connecting rod 30.

As the melt accumulator passage 22 fills with molten material from the extruder 12, the piston 28 is forced rearwardly in the cylinder 26 forcing hydraulic fluid in the cylinder 26 to flow out of the cylinder through a passage 32 through a back pressure valve 34 and, thence, into a tank 36. When the melt accumulator 18 has accumulated a shot size batch of molten resin, a shut off valve 38 is actuated to close the passage 16 and isolate the extruder 12 from the accumulator 18.

A hydraulic pump 40 is operable to pump hydraulic fluid from the tank 36 through an injection valve 42 into the cylinder 26. A pre-charged accumulator 41 operates in conjunction with the pump 40 to insure a rapid injection of fluid forcing the piston 20 to move rapidly in a direction to cause the piston 20 to inject molten resin through a supply passage 44 and injection nozzles 46 into the mold cavities 48. Two injection nozzles 46 are illustrated communicating with the passage 44, it being understood that operation of the apparatus 10 is the same whether one, two or more nozzles are used. Subsequent description will, therefore, deal with only one nozzle.

Simultaneously with injection of the resin into the mold cavities 48, the injection nozzles 46 are operated to inject an activator additive into the stream of resin-foaming agent mixture that is flowing into each of the mold cavities 48.

As shown in FIG. 2, each of the injection nozzles 46 includes a valve body 50 formed with a main passage 52 which communicates with the passage 44 which contains the flowing stream 54 of resin-foaming agent mixture. A tubular rod member 56, positioned coaxially within the passage 52, has an internal axial passage 58 that communicates at the discharge end of the member 56 with a transverse passage 60 which in turn communicates with the passage 52. A check valve member 62, positioned in an enlarged portion 64 of the passage 58, is movable between an open position shown in FIG. 2 and a seated or closed position shown in FIG. 3 in which it is engaged with a seat 66 so as to close the passage 58.

The passage 58 is connected to a line 68 which in turn communicates with a reservoir 70 for the activator additive which is added to the resin-foaming agent mixture at the injection valves 46. A high pressure pump 72 is connected at its inlet side to the reservoir 70 and at its outlet side to an accumulator 74 for the activator additive and with a directional valve 76 movable between two positions. In the position of the valve 76 illustrated in FIG. 2, it communicates the line 68 and the reservoir 70. In a moved position of the valve 76, communication between the line 68 and the reservoir 70 is blocked by the valve 76 and the pump 72 and its accumulator 74 are connected through the valve 76 to the inlet line 68. A flow control valve 78, interposed in the line 68 functions to adjust and control the amount of additive that is injected into the passage 58 from the accumulator 74. The additive flows through the passage 58 past the check valve element 62 and into the passage 60 for injection into the molten resin. When the flow of additive through the passage 58 is discontinued, the check valve member 62 is movable to the closed position illustrated in FIG. 3 to prevent back flow of molten resin into the passage 58.

The activator additive requires a predetermined period of time to react with the resin-foaming agent mixture and produce gas bubbles 80 (FIG. 5) in the mold. This time delay allows complete filling of the mold cavity 48 with the mixture of resin, foaming agent, and activator additive before foaming takes place.

The flow of additive through passage 58 is shut off by moving directional valve 76 to its off position illustrated in FIG. 2 allowing all of the activator additive to be purged from the passage 58 before the cylinder assembly 82 for the injection nozzle 46 is actuated to move the valve rod 56 to the closed position shown in FIG. 3 in which the inlet opening 83 for the mold is closed shutting off further flow of molten material to the mold cavity 48. The injection pressure at which the molten material is supplied to the mold cavity 48, preferably in the range of 300–600 psi, is high enough to provide for pressure engagement of the molten material with the mold walls thereby producing smooth surfaces and excellent replication.

During the time delay period between filling the mold and formation of the gas bubbles 80, preferably a time period between one and five seconds, the unfoamed resin mixture contacts the colder mold walls 84 and solidifies forming a solid skin 86 on the molded part 14 (FIG. 4). The core 90 of the molded article remains in a molten state due to heat retention. After expiration of the time delay period, the gas bubbles 80 evolve from the chemical reaction between the foaming agent and the activator additive.

Since the mold cavity 48 is completely filled and the core 90 is under pressure, the gas bubbles 80 remain initially in a microstructure. As the resin contracts due to the thermal shrinkage, the gas bubbles 80 grow larger, continuing to grow and expand and exert pressure on the surface skin 86 urging the skin 86 against the mold walls 84 until the core 90 cools off sufficiently to make the resin rigid enough to terminate the expansion. Thus, the process of this invention takes advantage of the combined phenomenons of delayed foam generation and thermal expansion. This eliminates the shrink marks that are normally found in molded parts obtained from conventional injection molding processes. Maximum achievable density reduction is dependent upon the coefficient of thermal expansion for each polymer used as the resin in the process of this invention and the temperature of the molten mass during injection.

The provision of the porous core 90 provides for a density reduction in the molded article in the range of 10%–30%. Examples of polymers that can be used in the process of this invention are high density polyethylene, high impact polystyrene, polypropylene, polycarbonate, modified polyphenylene oxide (PPO), and most thermoplastics.

The preferred chemically reactive foaming agent is sodium borohydride (SBH). Examples of activator additives are stearic acid, octanoic acid, oleic acid, polyacrylic acid, polystyrene sulfonic acid and water. In the chemical reaction of the foaming agent and the activator additive, a proton (H+) from the additive reacts with hydride (H−) on the $BH_4$ anion in the foaming agent to produce hydrogen ($H_2$) gas according to the following formula:

$$NaBH_4 + 2H_2O \rightarrow NaBO_2 + 4H_2$$

One gram of SBH yields 2.37 liters of hydrogen gas.

Further by way of illustration of the present invention, there is set forth below a specific example of the molding of a part 14 having an exterior solid surface skin 86 and a porous core 90.

High density polyethylene pellets having a solid density of 0.92 grams per cubic centimeter at 77° F. and a melt index of 8.0 g/10 min. are fed into the hopper 13 of the extruder 12. The extruder 12 has a 2½" diameter screw 15 and the resin is plasticated by the extruder screw running at 18.0 rpm. Sodium borohydride (SBH) granules are added to the hopper for the extruder 12 in a ratio of one part of sodium borohydride for each 400 parts of polystyrene so that the sodium borohydride forms approximately 0.25% of the melt in the extruder 12. It is to be understood that a range of foaming agent of from 0.1 to 1.0 percent can also produce satisfactory results.

The mold cavity 48 has a volume of 113 cubic inches. At the injection nozzle 46, an activator additive consisting essentially of water ($H_2O$) in an amount constituting 0.28% of the melt is added to the mixture and the molten mixture is injected into the mold cavity 48 at a pressure of 400 psi. The resulting article 14 has a solid skin 86 which accurately replicates the inner mold surface, a porous core 90 and a density reduction of 25% relative to a solid molded part.

From the above description, it is seen that this invention provides an improved method and apparatus for molding a structural foam article 14 having a solid exterior surface skin 86 and a porous core 90, the surface skin 86 accurately replicating the mold surface. The advantages of the invention are due to the exploitation of the combined phenomenons of delayed foam generation and thermal contraction. By virtue of the utilization of a chemical reaction to form the gas bubbles 80, the bubbles consist essentially of hydrogen gas which diffuses very rapidly out of the molded part after foaming. This enables more immediate post-finishing of the part 14 without risking the possibility of blistering caused by subsequent diffusing of the gas from the part. Further, the hydrogen gas is safely and readily vented by normal industrial safety practices. The foaming agent that is preferred in the process of this invention, namely, sodium borohydride has the advantage it does not leave any toxic or standing residue on the molded part and leaves only the bi-product sodium metaborate which is odorless, non-toxic and non-contributory to color development of the finished part.

The reaction rate of generation of the bubbles 80 can be controlled by varying the pH of the resin mixture. Increasing the acidity of the mixture will accelerate the reaction; increasing the basicity will retard it. The presence of certain transition metals (cobalt, nickel, copper) catalyses the foaming reaction in polymers basic in composition. Chelating agents can also be added to the system to tie up these metals and retard the reaction. Thus it is possible in the process of this invention to develop resin-foaming systems that have controlled rates of gas evolution over a wide temperature range.

What is claimed is:
1. The method for producing injection molded plastic articles from a thermoplastic resin comprising:
   a. melting a thermoplastic resin containing a chemically reactive foaming agent;
   b. injecting said thermoplastic resin containing said foaming agent as a stream into a mold so as to fill the mold cavity with unfoamed molten resin containing the foaming agent;
   c. introducing an activator additive into said stream immediately prior to injection of said stream into said mold cavity, said material in the mold cavity solidifying on engagement with the mold cavity surface to form a solid skin at the mold surface, said additive chemically reacting with said foaming agent after a time delay in said mold resulting in the generation of gas bubbles in said resin within the confines of said skin whereby to form a molded article having a solid exterior surface which is a detailed replicate of the mold surface and a porous interior which expands in the mold to maintain the solid exterior surface in pressured contact with the mold surface.

2. The method according to claim 1 wherein said foaming agent is sodium borohydride.

3. The method according to claim 1 wherein said thermoplastic resin containing said foaming agent is transferred to an accumulation zone where it is maintained in a molten state prior to injection into said mold, and wherein when sufficient molten resin is in said accumulation zone to fill the mold, said molten resin is ejected from said accumulation zone to form a resin stream which is injected into said mold so as to fill the mold cavity.

4. Apparatus for forming in a mold a plastic article having a solid exterior surface and a porous interior core comprising:
   a. plasticator means adapted to provide a melt of a thermoplastic resin containing a chemically reactive foaming agent;
   b. an injection mold;
   c. means for transferring said molten resin containing said foaming agent in a stream to said mold so as to fill the mold cavity with unfoamed molten resin containing said foaming agent;

d. means for introducing an activator additive into said stream immediately prior to injection of said stream into said mold cavity;

said resin melt engaging the walls of said mold cavity and solidifying thereon and conforming thereto so as to form said solid exterior surface on said article and said additive reacting chemically with said foaming agent to form gas bubbles in said resin to provide said plastic article with a porous interior core and generate an internal pressure in said mold maintaining the exterior surface of said article in intimate contact with the mold.

5. Apparatus according to claim 4 wherein said means for introducing said activator additive comprises at least one injection nozzle through which said stream flows, each said nozzle including a body having a discharge opening communicating with said mold, a reciprocatable rod member supported on said body and projecting into said stream, a passage for activator additive in said rod having a discharge end communicating with said stream, and supply means for directing additive into said passage for discharge into said stream.

6. Apparatus according to claim 5 further including means operatively associated with said rod member for moving said rod member to a position closing said opening to the mold.

7. Apparatus according to claim 6 further including check valve means in said passage in the path of said activator additive operable to block the flow of molten resin from said stream into said passage.

* * * * *